United States Patent [19]

Akutagawa

[11] Patent Number: 5,232,192
[45] Date of Patent: Aug. 3, 1993

[54] SUSPENDER ARM FOR MACHINERY

[75] Inventor: Masazumi Akutagawa, Yokosuka, Japan

[73] Assignee: Kabushiki Kaisha Kokuho, Yokosuka, Japan

[21] Appl. No.: 885,879

[22] Filed: May 20, 1992

[30] Foreign Application Priority Data

| May 22, 1991 | [JP] | Japan | 3-036466[U] |
| May 22, 1991 | [JP] | Japan | 3-036468[U] |
| May 22, 1991 | [JP] | Japan | 3-036470[U] |

[51] Int. Cl.$^5$ .............................................. F16M 5/00
[52] U.S. Cl. .................................... 248/646; 238/283; 238/285
[58] Field of Search ............... 248/646, 657, 669, 283, 248/285, 132, 145, 324, 327, 287, 276

[56] References Cited

U.S. PATENT DOCUMENTS

| 1,682,180 | 8/1928 | Merrill | 248/285 X |
| 1,751,691 | 3/1930 | Flath | 248/285 |
| 1,875,235 | 8/1932 | Grube | 248/285 X |
| 4,562,987 | 1/1986 | Leeds et al. | 248/283 X |
| 5,004,203 | 4/1991 | Fabius | 248/285 |

Primary Examiner—Ramon O. Ramirez
Attorney, Agent, or Firm—Sughrue, Mion, Zinn, Macpeak & Seas

[57] ABSTRACT

A suspender arm for suspending machinery such as welding equipment, for example, has a swing beam supported rotatably in a horizontal plane at its base end by a base member actuated vertically and/or horizontally by electric motors according to demand, a slide beam disposed to the swing beam slidably in the longitudinal direction of the swing beam, a hanger disposed to the slide beam movable along the slide beam for suspending a wire feeder of the welding equipment and some rings attached slidably to respective wires stretched between both ends of the swing beam and the slide beam for suspending cables of the welding equipment.

9 Claims, 16 Drawing Sheets

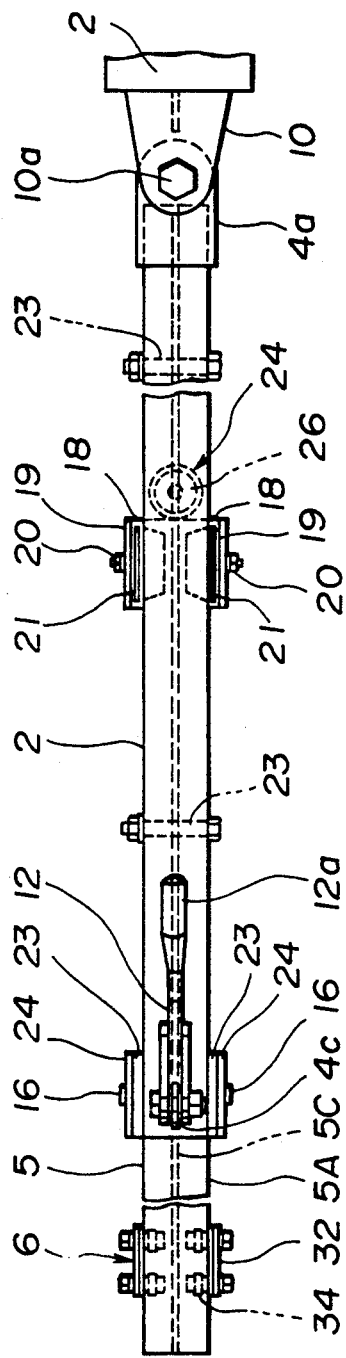
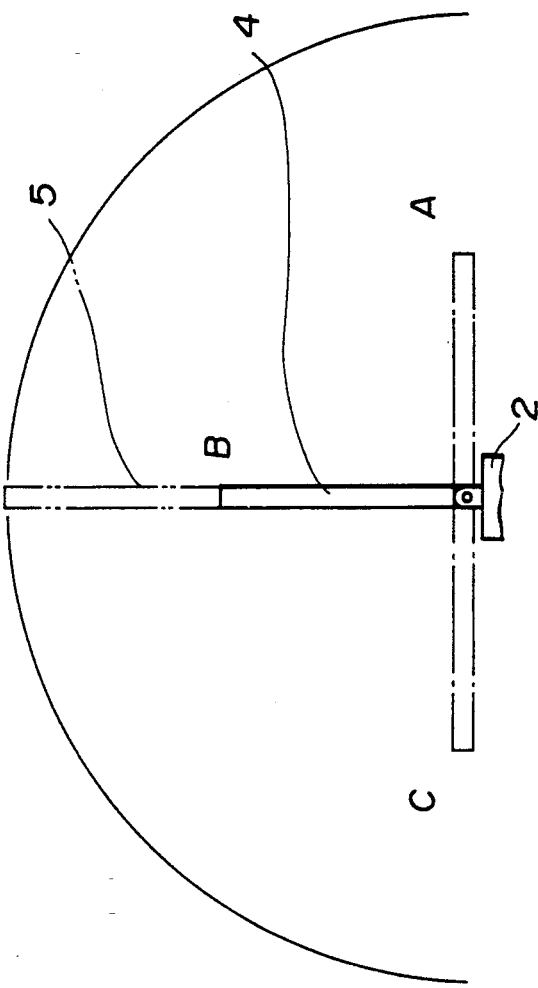
FIG. 9
FIG. 10

SUSPENDER ARM FOR MACHINERY

BACKGROUND OF THE INVENTION

1. Field of the Invention

This invention relates to a suspender arm for suspending machinery and tools, and more particularly to a suspender arm which is expansible and rotatable swingingly, and used for suspending, for example, a wire feeder of welding equipment or an intake nozzle of dust-collecting equipment in various factories such as a machine shop, a shipyard and so on.

2. Description of the Prior Art

In a case of welding work in various factories or plants such as a machine shop, an engineering work, a shipyard and so on, a wire feeder of a semi-automatic arc welding machine is often placed on a floor or works in a workshop, for example. Therefore, there is a problem in that a welding cable, a control cable and a gas hose (in a case of gas shielded arc welding) of the welding equipment may be damaged by catching angular parts of the works and machine tools disposed in the workshop, and may coil round the feet of workers happened to be by because the cables and the hose creep on the floor and the works in company with movement of the welder according to the progress of the welding work.

Additionally, in the case of such the welding work, it is necessary to ventilate the room very powerfully for protecting the welder and the worker so as not to inhale welding fume and dust generated by, for example, grinding the works after the welding work. Therefore, dust-collecting equipment is furnished in the workshop so as to suck the welding fume and the dust, and collect them into a dust extractor of the dust-collecting equipment through an intake nozzle disposed nearby the works and a flexible duct connecting between the intake nozzle and the dust extractor since a ventilator such that provided on the roof or the wall of the workshop is not so powerfull to collect the welding fume and the dust generated by the grinding work.

However, also in this case, there is the possibility that the flexible duct connecting between the intake nozzle and the dust extractor may be damaged and coil round the feet of the workers similarly to the case of the cables and the gas hose of the welding equipment when the intake nozzle is moved according to the progress of the welding work.

SUMMARY OF THE INVENTION

This invention is made to solve the aforementioned problem of the prior art, and it is an object to provide a suspender arm which is possible to hold suspendingly machinery, such as a wire feeder of welding equipment inclusive a cable and the like, or an intake nozzle of dust-collecting equipment inclusive a duct so as not to obstruct passage of the workers and transportation of works or tools, and is never in the way of an overhead traveling crane and so on in itself.

The construction of the suspender arm according to this invention in order to accomplish the above-mentioned object is characterized by comprising a swing beam supported rotatably in a horizontal plane at a base end thereof, by a base member actuated vertically or horizontally by driving means according to demand, and a slide beam disposed to the swing beam slidably in a longitudinal direction of the swing beam.

The suspender arm according to this invention is so designed that the swing beam may be rotate swingingly together with the slide beam around the base end of the swing beam, and the total length of the both beams may extend by sliding the slide beam in the longitudinal direction of the swing beam. Therefore, when the hanger means, which is disposed movably on the slide beam, is attached with, for example, the wire feeder of the welding equipment or the intake nozzle of the dust-collecting equipment, the range is made wider where the welding work or the dust-collecting work can be performed. Additionally, the welding cable, the gas hose and so on of the welding equipment, and the duct of the dust-collecting equipment are made so as not to obstruct the passage of workers, the transportation of the works or the tools, and the like by suspending them from the swing beam and the slide beam of the suspender arm. Furthermore, by drawing back the slide beam and shortening the total length of the both beams or by rotating the swing beam swingingly together with the slide beam in the suitable direction, the overhead traveling crane is never disturbed to transport the works or the tools by the beams of the suspender arm.

BRIEF DESCRIPTION OF THE DRAWINGS

FIG. 9 is a top plan view of the suspender arm shown in FIG. 1;

FIG. 10 is a schematic plan view showing a swinging range of a swing beam and a slide beam of the suspender arm shown in FIG. 1;

DESCRIPTION OF THE PREFERRED EMBODIMENT

The first embodiment of the suspender arm according to this invention will be described below on basis of FIG. 1 to FIG. 10. In this embodiment, a case is exemplified where a semi-automatic arc welding machine is suspended as machinery.

Figure 1:
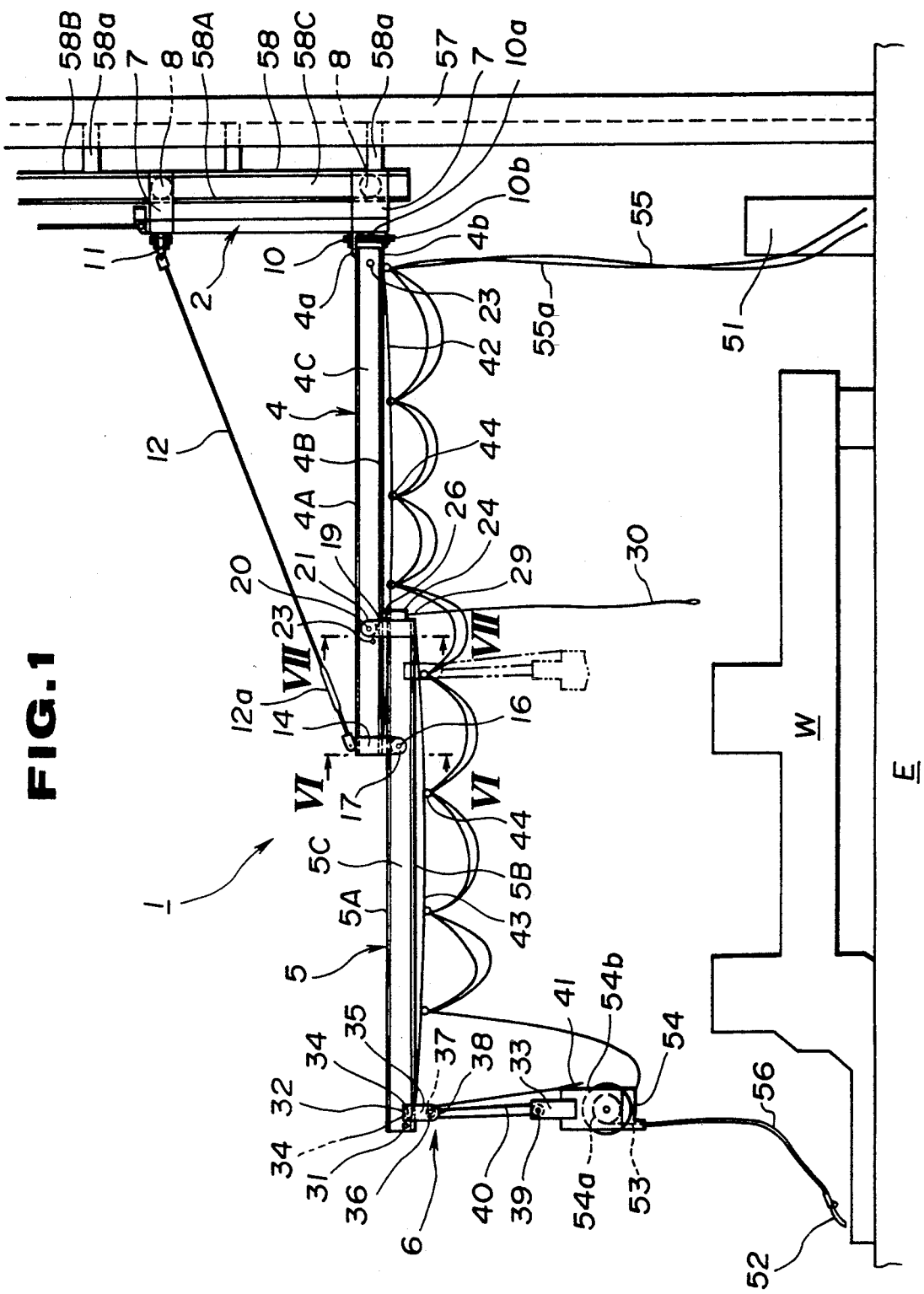
FIG. 1 is a side view illustrating the first embodiment of a suspender arm according to this invention.

The semi-automatic arc welding machine shown in FIG. 1 comprises a welding source 51 disposed in the vicinity of a pillar 57 of the workshop house, a welding torch 52, and a wire feeder 54 having a welding wire 53 coiled on a reel 54a and a feed motor (not shown) for feeding the welding wire 53 to the welding torch 52, and so designed that the feed motor is supplied with electric power through a control cable 55a connecting between the wire feeder 54 and the welding source 51, the welding torch 52 is fed with the welding wire 53 through a flexible conduit 56 provided between the welding torch 52 and the wire feeder 54 and a welding current is supplied to the welding torch 52 through a welding cable 55 connecting between the welding source 51 and the welding torch 52.

A suspender arm 1 is disposed in the pillar 57, and composed mainly of a base member 2 disposed movably to the pillar 57 through a rail 58 in the vertical direction along the pillar 57 of the workshop house, a motor driven chain hoist 3 as a base driving means for actuating the base member 2 vertically, a swing beam 4 supported by the base member 2 rotatably in a horizontal plane, a slide beam 5 disposed under the swing beam 4 slidably in the longitudinal direction of the swing beam 4, and a hanger 6 (hanger means) disposed on the slide beam 5 movably along the slide beam 5 for suspending the wire feeder 54 in this embodiment.

Figure 2:
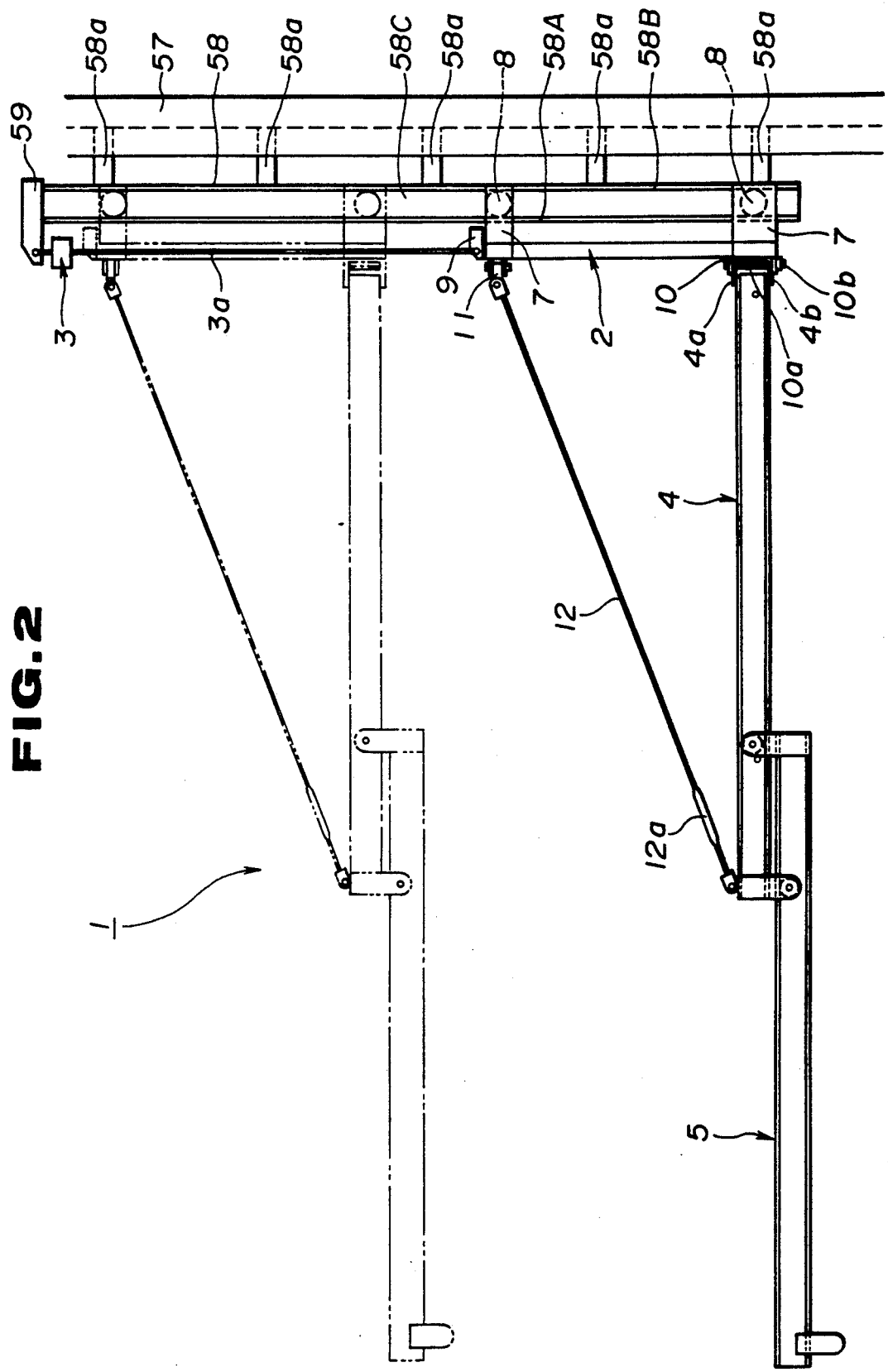
FIG. 2 is an enlarged view illustrating vertical movement of the suspender arm shown in FIG. 1.
Figure 3:
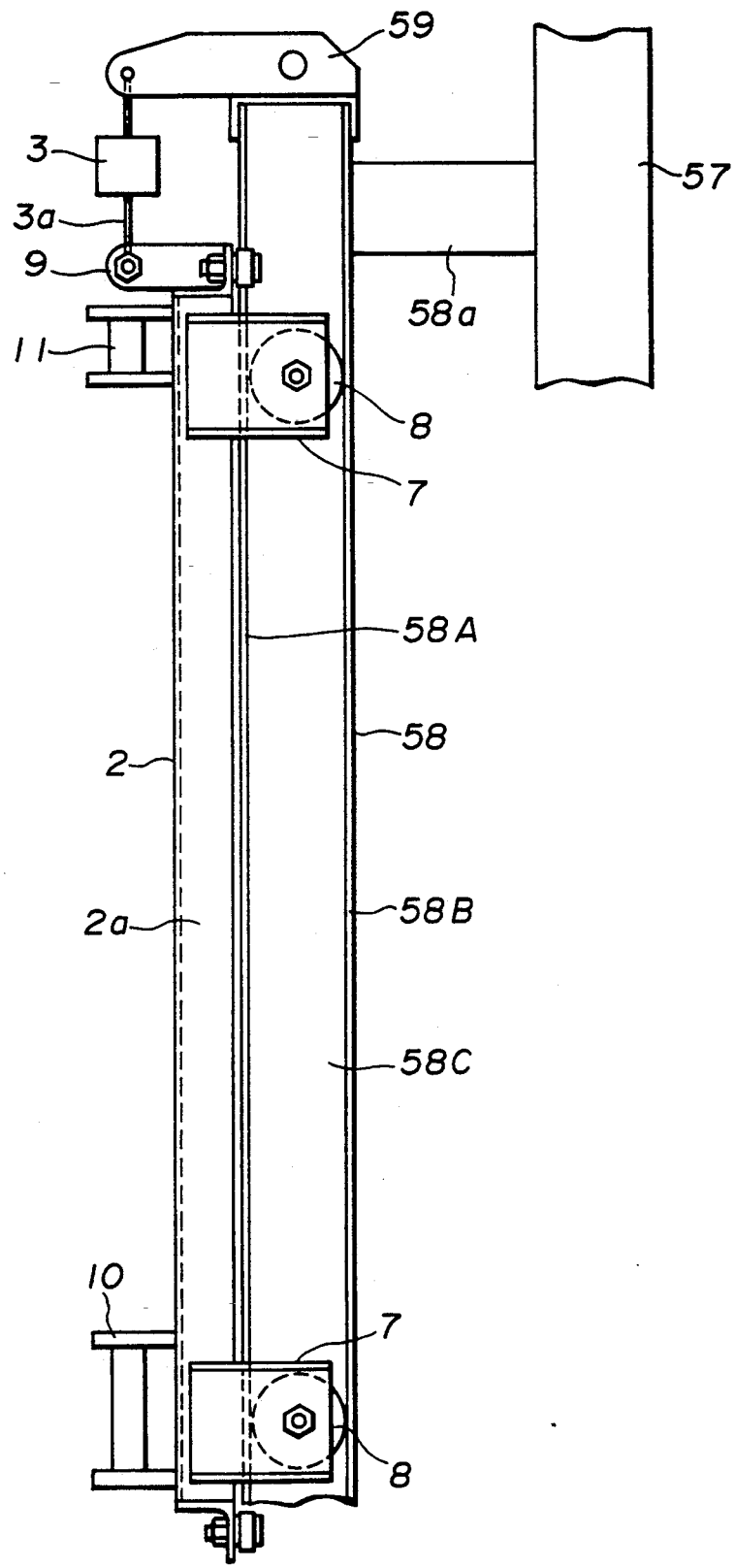
FIG. 3 is an enlarged side view illustrating positional relationship between a base member and a rail of the suspender arm shown in FIG. 1.
Figure 4:
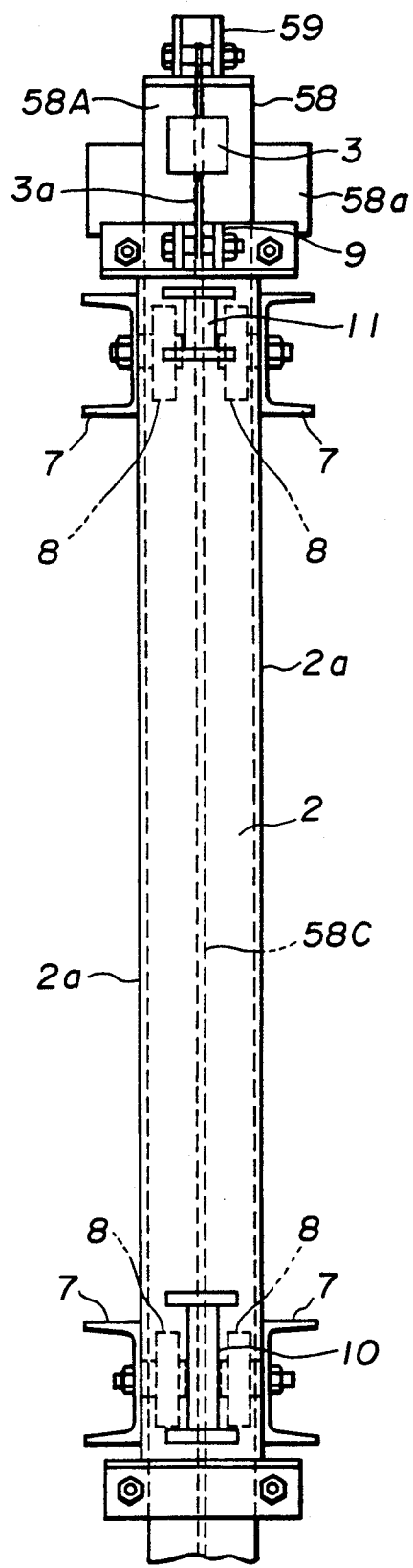
FIG. 4 is a front view of the base member shown in FIG. 3.

The base member 2 is so structured as to move along the rail 58, which is made of I section steel and provided to the pillar 57 of the workshop house in parallel with the pillar 57 through a bracket 58a as shown in FIGS. 2, 3 and 4. The base member 2 is made of channel steel, disposed in parallel to the rail 58 so that the opening side of the channel steel is directed to the rail 58, and provided with roller supports 7 on outer wall 2a of the flanges of the channel steel at the upper and lower ends of the base member 2. The roller supports 7 are disposed with rollers 8 facing with each other at their ends extending toward the rail 58, respectively, and the rollers 8 are disposed between flanges 58A and 58B on both sides of a web 58C of the rail 58. Whereby, the base member 2 is so structured as to move smoothly along the rail 58, that is, along the pillar 57 of the workshop house.

The motor driven chain hoist 3 schematically shown in FIGS. 2, 3 and 4 is suspended from a bracket 59 disposed at the top end of the rail 58, and a chain 3a of the chain hoist 3 is connected to a connector bracket 9 secured to the top end of the base member 2.

The swing beam 4 is made of I section steel similarly to the rail 58 and provided with an upper plate 4a and a lower plate 4b at the base end thereof as shown in FIG. 2. The upper and lower plates 4a and 4b of the swing beam 4 are fitted to a beam bracket 10 provided to the lower end of the base member 2, and the swing beam 4 is attached to the base member 2 rotatably in a horizontal plane by putting a bolt 10a in the vertical direction through holes formed in the plates 4a, 4b and the beam bracket 10 and holding the bolt 10a firmly with a nut 10b in this state.

In this case, a stay 12 is disposed rotatably together with the swing beam 4 between a hinge 11 provided to the upper end of the base member 2 and a projection 4c (see FIG. 6) provided on an upper flange 4A at the front end of the swing beam 4 so that the swing beam 4 may not deflect by adjusting the length of the stay 12 by turning a turn buckle 12a disposed on the stay 12 adjacent the projection 4c.

Figure 6:
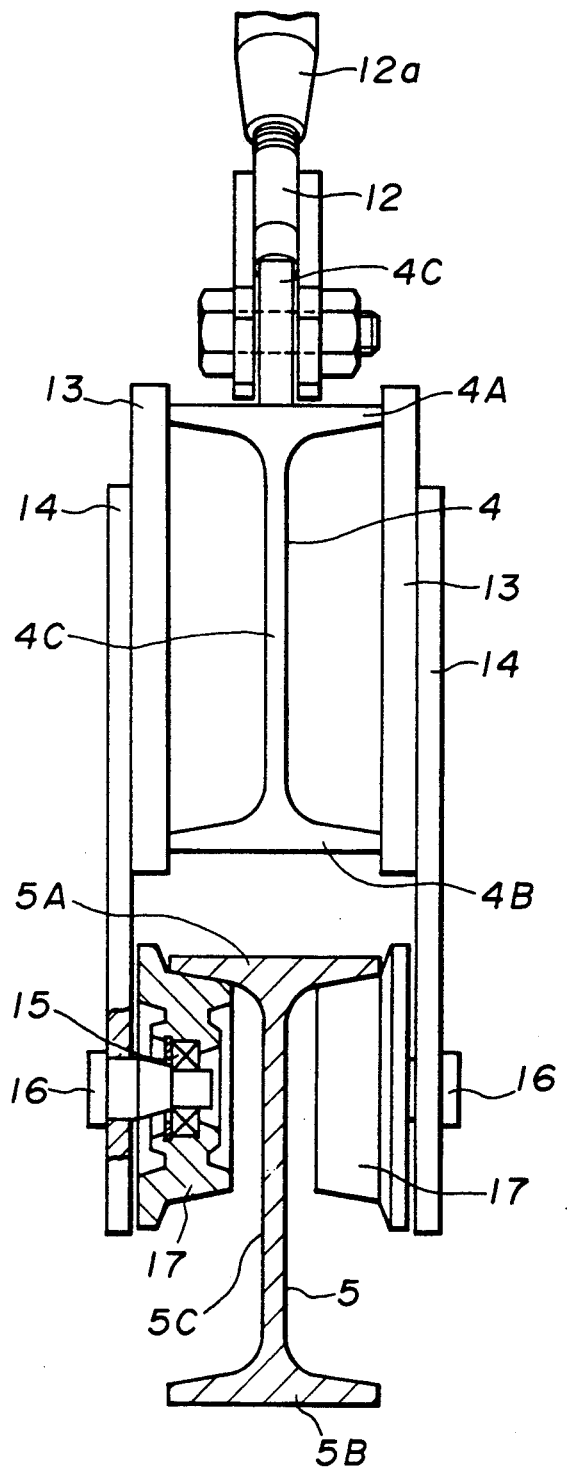
FIG. 6 is an enlarged sectional view along section lines VI—VI of FIG. 1.

The swing beam 4 is provided with roller suspender plates 14 facing each other and extending downwardly to the slide beam 5 through base plates 13 fixed between upper and lower flanges 4A and 4B on both sides of the front end thereof as shown FIG. 6. The roller suspender plates 14 are provided with respective rollers 17 supported by roller shafts 16 through bearings 15 on the internal faces thereof.

Figure 7:
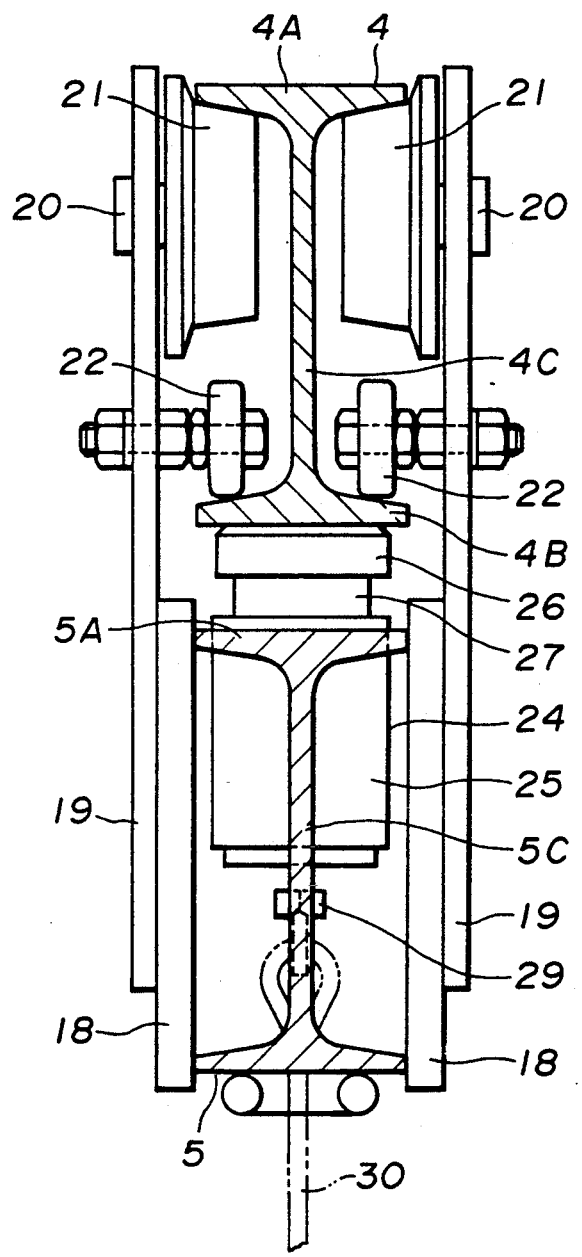
FIG. 7 is an enlarged sectional view along section lines VII—VII of FIG. 1.

The slide beam 5 is made of I section steel similarly to the swing beam 4 as shown FIGS. 6 and 7, and has an overall length about equal to that of the swing beam 4. The slide beam 5 is provided with roller support plates 19 facing each other and extending upward to the swing beam 4 through base plates 18 fixed between upper and lower flanges 5A and 5B on both sides of the base end thereof as shown in FIG. 7. And the roller support plates 19 are provided with rollers 21 supported by roller shafts 20 on the internal faces thereof, respectively. The roller 17 attached to the swing beam 4 are so designed as to roll in contact with the lower face of the upper flange 5A on both sides of a web 5C of the slide beam 5, and the rollers 21 attached to the slide beam 5 are so formed as to roll in contact with the lower face of the upper flange 4A on both sides of a web 4C of the swing beam 4. Whereby, the slide beam 5 is disposed to the swing beam 4 slidably in the longitudinal direction of the swing beam 4, namely, it is enabled to extend from the front end of the swing beam 4.

In this case, the roller support plates 19 are also disposed with rollers 22 to be in contact with the upper face of the lower flange 4B of the swing beam 4 on the internal faces thereof so as not to rattle between the both beams 4 and 5, and the swing beam 4 is disposed with stoppers 23 at positions adjacent the front end and the base end so as to put a limitation of the slidable range of the slide beam 5 as shown in FIG. 9.

Figure 8:
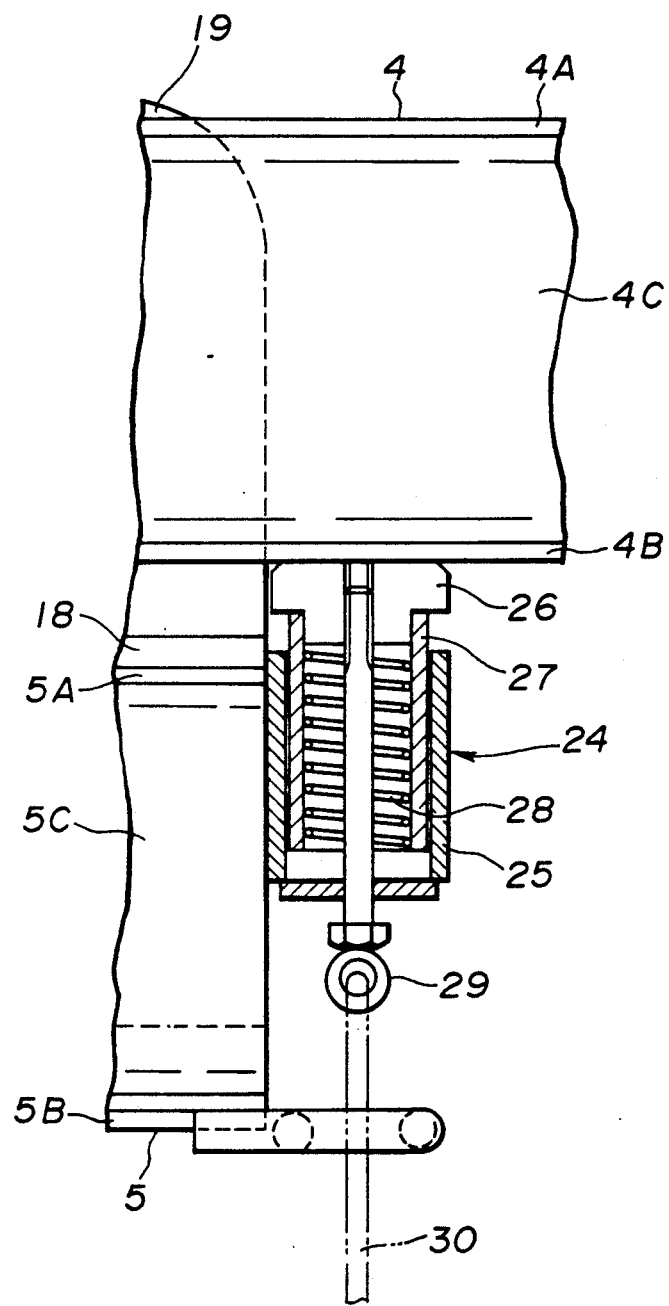
FIG. 8 is an enlarged sectional view of a brake of the suspender arm shown in FIG. 1.

Furthermore, the slide beam 5 is provided with a brake 24 at the base end thereof. The brake 24 is provided, as shown in FIG. 8, with a cylindrical case 25 having a bottom and fixed to the base end of the slide beam 5, a cylinder 27 fitted into the case 25 and disposed to its upper end with a brake shoe 26 to be in contact with the lower flange 4B of the swing beam 4, and a coil spring 28 housed in the cylinder 27 for upwardly energizing the brake shoe 26. Therefore, it is possible to relatively fix the slide beam 5 to the swing beam 4 by pressing the brake shoe 26 against the lower flange 4B of the swing beam 4 according to elasticity of the coil spring 28. And the brake 24 is further provided with an eye bolt 29 passing through the bottom of the case 25 and connected with the brake shoe 26 and a wire 30 connected with the eye bolt 29, and so designed as to set free the slide beam 5 from the relatively fixed state by pulling the wire 30 downwardly and releasing the brake shoe 26 from the lower flange 4B of the swing beam 4. And the slide beam 5 is operable slidingly in this state by pulling the wire 30 in the longitudinal direction of the swing arm 4.

Figure 5:
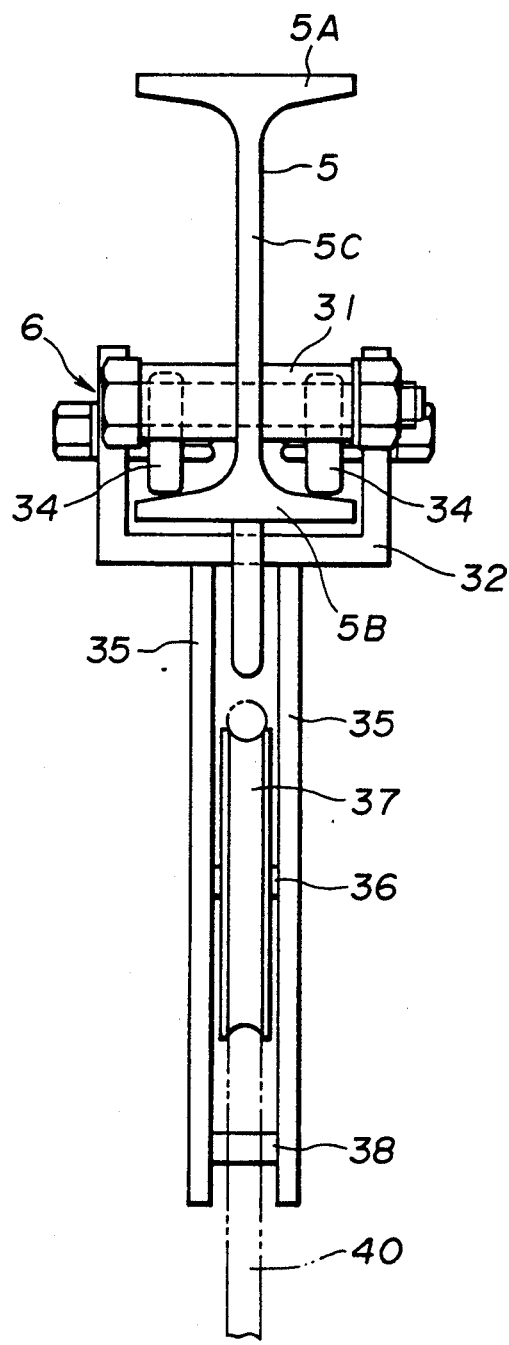
FIG. 5 is an enlarged front view of a slide beam of the suspender arm shown in FIG. 1.

The hanger 6 is provided, as shown in FIG. 5, with a roller holder frame 32 having a U-like shaped section to be fitted with the lower flange 5B of the slide beam 5 and a suspending bracket 33 (not shown in FIG. 5, see FIG. 1) attached to the wire feeder 54 of the semi-automatic arc welding machine.

The frame 32 is disposed rollers 34 to be in contact with the upper face of the lower flange 5B on both sides of the web 5C of the slide beam 5 on the internal faces of walls thereof facing each other, and so structured as to move along the lower flange 5B of the slide beam 5. In this case, the slide beam 5 is disposed with a stopper 31 at the front end of the web 5C thereof so that the frame 32 may not disengage from the slide beam 5.

The frame 32 is provided with a pair of pulley suspender plates 35 extending downwardly from the bottom face thereof, and the plate 35 are disposed with a pully 37 supported by a pin 36 therebetween and another pin 38 to be connected with a rope 40 at the lower part from the pulley 37.

The suspending bracket 33 is secured to the wire feeder 54 at the upper end of a reel case 54b of the wire feeder 54 and disposed with a pulley 39 at the upper end thereof, as shown in FIG. 1.

The wire feeder 54 of the semi-automatic arc welding machine is suspended from the hanger 6 by stretching the rope 40 of which one end is fixed to the pin 38 of the hanger 6 between the pulley 39 of the suspending bracket 33 and the pulley 37 of the hanger 6 and trying up another end of the rope 40 to a hook 41 disposed on the reel case 54b of the wire feeder 54 so as to move horizontally by shifting the hanger 6 along the slide beam 5 and vertically by adjusting the length of the rope 40.

Additionally, the suspender arm 1 is disposed with suspending wires 42 and 43 stretched between the respective both ends of the swing beam 4 and the slide beam 5 under the respective lower flanges 4A and 5A in order to suspend the welding cable 55, the control cable 55a and so on through several rings 44, which form cable hanger means together with wires 42 and 43.

Explanation will be given below about the welding procedure using the semi-automatic arc welding machine of which wire feeder 54 and cables 55 and 55a are suspended by the afore-mentioned suspender arm 1.

First of all, the swing beam 4 is moved to a position in which the swing beam 4 can be rotated swingingly without hindrance by actuating the motor driven chain hoist 3 as shown with two-dot chain lines in FIG. 2.

Next, the swing beam 4 sited at position A (or position C) adjacent to the pillar 57 of the workshop house as shown in FIG. 10 with chain lines is turned swingingly in the anticlockwise direction (or the clockwise direction) and aligned in the direction of a position B as shown with solid lines in FIG. 10. And then the swing beam 4 is shifted to height suitable for the welding by actuating again the motor driven chain hoist 3.

In a case of welding the left side of the weldment W shown in FIG. 1, the slide beam 5 is slided leftwardly in FIG. 1 (upwardly in FIG. 10) by pulling the wire 30 in the direction of the front end of the swing beam 4 at the same time that the relatively fixed state of the slide beam 5 is released by pulling the wire 30 of the brake 24. And the wire 30 is released at the time that the slide beam 5 is drawn out sufficiently from the front end of the swing beam 4 as shown in FIG. 1 (as shown with two-dot chain lines in FIG. 10), thereby fixing the slide beam 5 to the swing beam 4 relatively. In this time, the slide beam 5 is never disengaged from the swing beam 4 since the roller support plates 19 come in contact with the stopper 23 disposed on the swing beam 4 adjacent to the front end.

Subsequently, the hanger 6 is moved from a position shown with two-dot chain lines to a position at the front end of the slide beam 5 as shown with solid lines in FIG. 1, and welding is started by operating the welding torch 52.

Since the welding cable 55, the control cable 55a and the like are suspended by the suspending wires 42 and 43, workers in the workshop are never carried off their feet by the cables clinging to their feet, and the cables never happen to catch the weldment W or the like, so that it is possible to shift the wire feeder 54 of the welding machine very smoothly. Additionally, the hanger 6 is never disengaged from the slide beam 5 since the frame 32 of the hanger 6 comes in contact with the stopper 31 disposed on the front end of the slide beam 5.

In the case where the weldment W is welded continuously to the right side from the left side thereof in FIG. 1, the welding is carried out to the middle part of the weldment W, moving the hanger 6 rightwardly along the slide beam 5 correspondent to proceeding of the welding. Then, the slide beam 5 is retracted rightwardly in FIG. 1 after releasing the brake 24 and the hanger 6 is shifted temporarily toward the front end of the slide beam 5, and the welding is proceeded to the right side from the middle part of the weldment W, moving again the hanger 6 rightwardly along the slide beam 5 at the same time according to the proceeding of the welding. In this time, the slide beam 5 never comes into collision with the rail 58 since the roller support plates 19 come in contact with the stopper 23 disposed on the swing beam 4 adjacent to the base end.

Additionally, in a case where the weldment W is high from top to base, it is possible to deal with the welding of high place by lifting up the wire feeder 54 of the welding machine by adjusting the rope 40 of the hanger 6. And when the weldment W is further high and it is not possible to lift up the wire feeder 54 sufficiently by merely adjusting the rope 40 of the hanger 6, it is possible to cope with the welding of the high place easily by raising the swing beam 4 by actuating the motor driven chain hoist 3.

After this, it is possible to weld within a range where the swing beam 4 can ascend and descend in the semi-circle shown in FIG. 10 by raising and lowering the swing beam 4 and turning swingingly in the range from the position A to the position C shown in FIG. 10.

In a case where it is necessary to carry products, works, tools or the like in the neighborhood of the weldment W by using a crane (not shown) for example while welding, it is possible to avoid the swing beam 4 and the slide beam 5 to block the way of the transportation by turning the swing beam 4 to the position A or C as shown in FIG. 10, retracing the slide beam 5 slidingly toward the base end of the swing beam 4, or by lowering the swing beam 4 to the lower position temporarily.

In the aforementioned procedure of operations of the suspender arm 1, the order of the ascent and descent of the swing beam 4, the turning of the swing beam 4, the sliding of the slide beam 5 and moving of the hanger 6 is not restricted only to the above-mentioned order, and may be changed adequately. And though the motor driven chain hoist 3 is exemplified as a base driving means in this embodiment, a manual driven chain hoist may be used as the base driving means.

The second embodiment of the suspender arm according to this invention will be described below on basis of FIG. 11 to FIG. 18. In this embodiment, a suspender arm is exemplified which is possible to move also in the horizontal direction in addition to the vertical movement and the swinging movement, and possible to be applied to massive welding construction.

Figure 11:
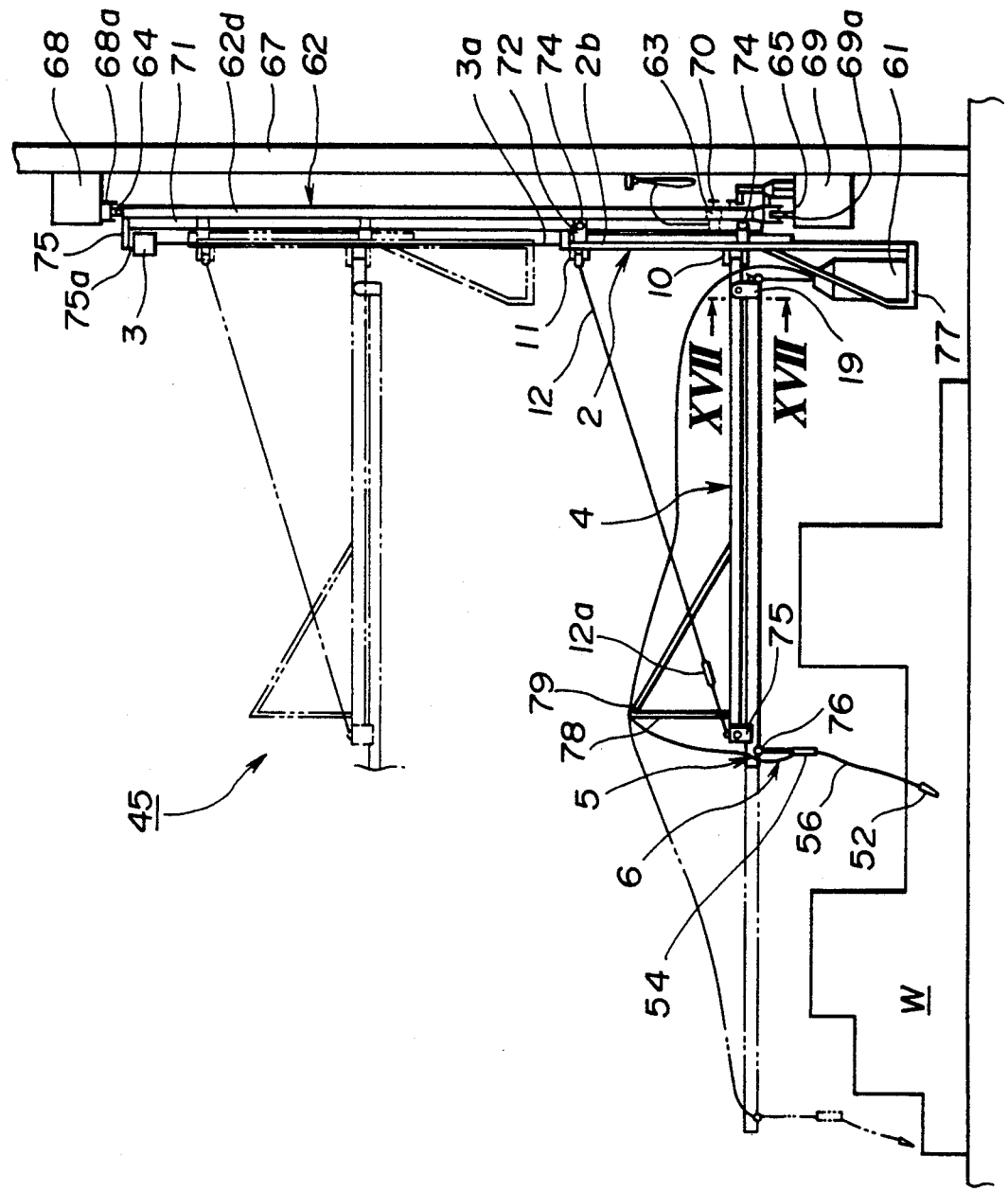
FIG. 11 is a side view illustrating the second embodiment of the suspender arm according to this invention.

A semi-automatic arc welding machine mounted on the suspender arm according to this embodiment comprises, as shown in FIG. 11, a welding source (not shown) disposed in the workshop, a welding torch 52, a container pail 61 contained with a welding wire and a wire feeder 54 having a feed motor (not shown) for feeding the welding wire to the welding torch 52, and so designed that the feed motor of the wire feeder 54 is supplied with electric power through a control cable (not shown) connecting between the wire feeder 54 and the welding source, the welding torch 52 is fed with the welding wire through a flexible conduit 56 provided between the welding torch 52 and the container pail 61 and a welding current is supplied to the welding torch 52 through the welding cable 55 connecting between the welding source and the welding torch 52.

Figure 12:
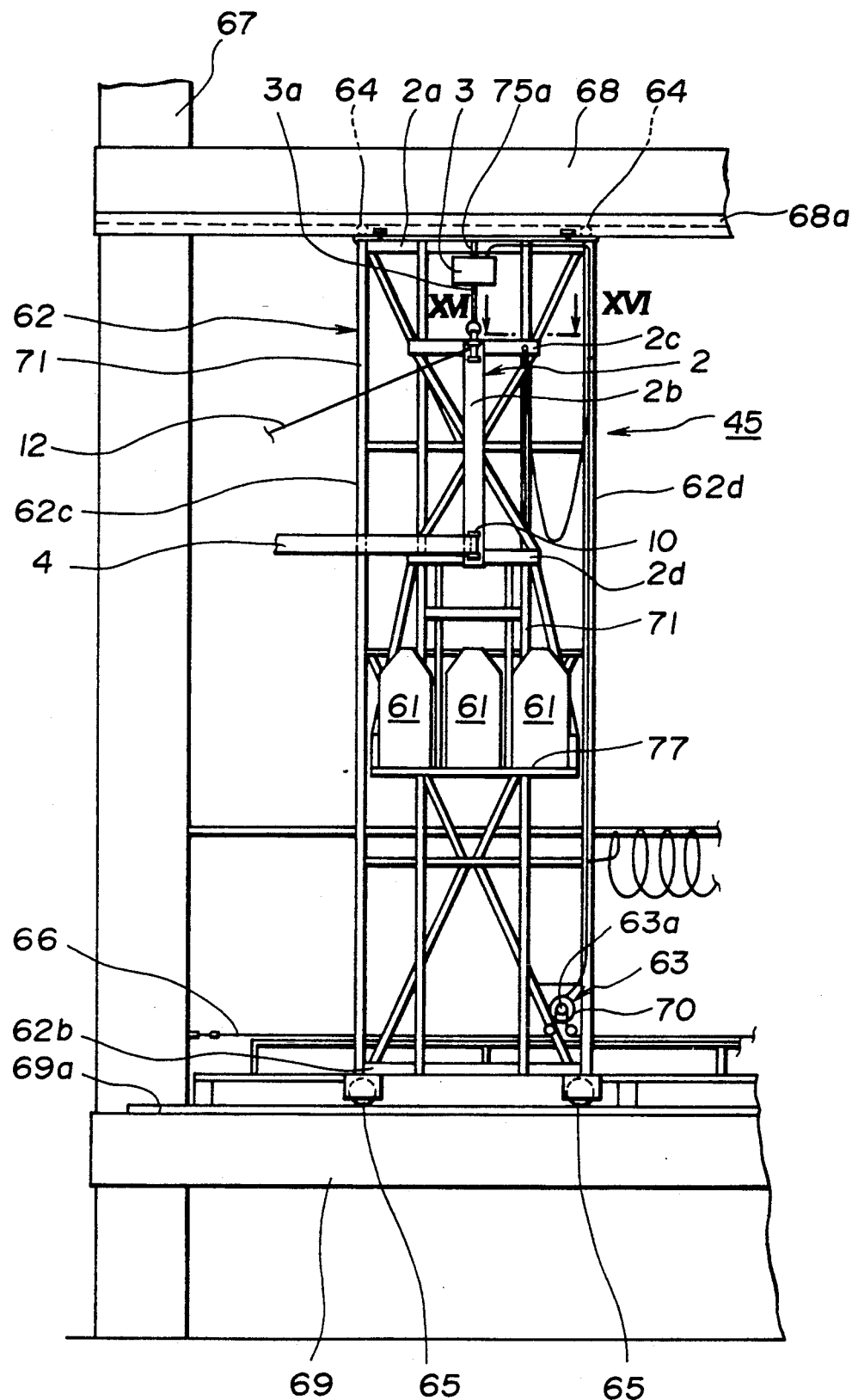
FIG. 12 is a front view of the suspender arm shown in FIG. 11.

A suspender arm 45 to suspend the wire feeder 54, cable 55 and the like of the semi-automatic arc welding machine is disposed between pillars 67 of the workshop house as shown in FIG. 11 an FIG. 12, and composed mainly of a frame member 62 provided between upper and lower crossbeams 68 and 69 installed between the upper and lower ends of the pillars 67, an electric motor 63 (frame driving means) for driving the frame member 62, a base member 2 installed on the frame member 62, a motor driven chain hoist 3 (base driving means) for actuating the base member 2 in the vertical direction, a swing beam 4 attached to the base member 2 rotatably in a horizontal plane, a slide beam 5 installed under the swing beam 4 slidably in the longitudinal direction of the swing beam 4, and a hanger 6 (hanger means) installed on the slide beam 5 movably along the slide beam 5 for suspending the wire feeder 54 of the welding machine.

The frame member 62 is framed in a rectangular shape with some structural members, and so structured as to be movable laterally along the upper and lower crossbeams 68 and 69 by engaging rollers 64 and roller wheels 65 disposed on a upper frame 62a and a lower frame 62b of the frame member 62 to rails 68a and 69a disposed on the respective opposed faces of the upper and lower crossbeams 68 and 69.

The motor 63 is provided on the lower part of the frame member 62, a chain 66 stretched along the lower crossbeam 69 on the upper side of the lower crossbeam 69 is wound around a sprocket 70 secured on the output shaft 63a of the motor 63. Therefore, the frame member 62 is driven by power of the electric motor 63.

The frame member 62 is provided with two rails 71 made of channel steel between vertical frames 62c and 62d, which are fixed in parallel to the vertical frames 62c and 62d, the base member 2 is so structured as to move vertically on the rails 71.

Figure 16:
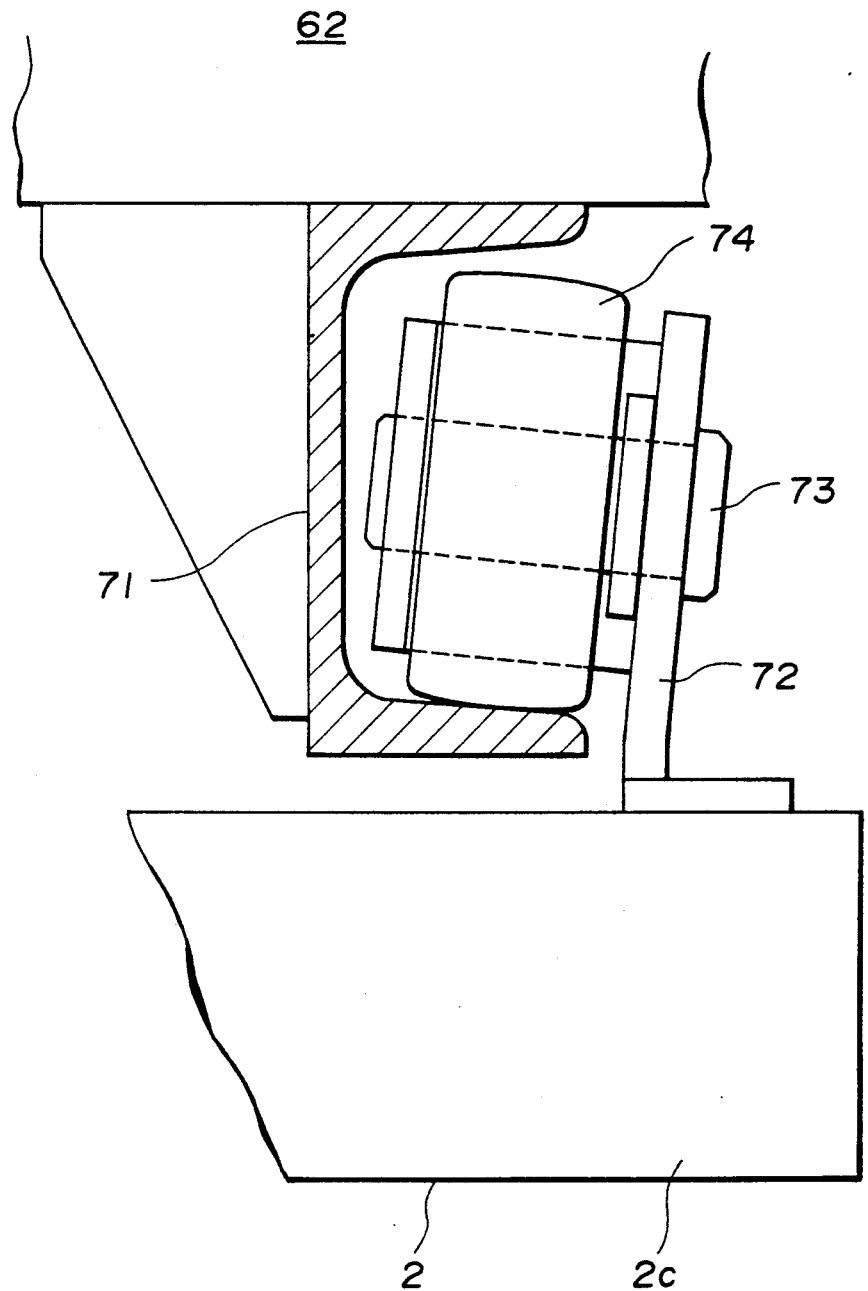
FIG 16 is an enlarged sectional view along section lines XVI—XVI of FIG. 12.

The base member 2 is composed of a base 2b, upper and lower horizontal bars 2c and 2d fixed to the upper and lower end of the base 2b, and the upper and lower horizontal bar 2c and 2d is secured with roller brackets 72 protruding toward the frame member 62 on the respective both ends thereof as shown in FIG. 16, rollers 74 supported by the roller brackets 72 through pins 73 are disposed between walls of the rails 71 opposed with each other so that the base member 2 may move vertically along the rails 71. And the roller brackets 72 are also provided with other rollers (not shown) at positions apart from the rollers 74 so as to move the base member 2 smoothly.

The motor driven chain hoist 3 is suspended through a wire 75a from a bracket 75 disposed at the middle portion of the upper frame 62a of frame member 62, and a chain 3a of the chain hoist 3 is connected to the upper end of the base 2b of the base member 2.

Figure 14:
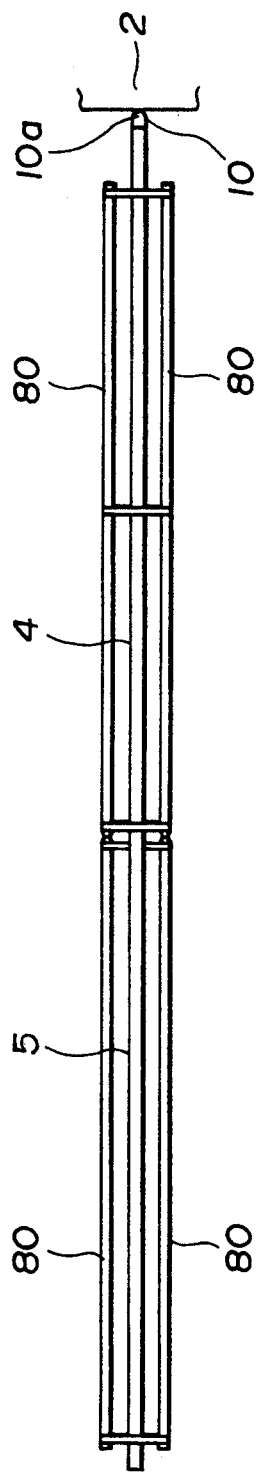
FIG. 14 is a top plan view of the beams of the suspender arm shown in FIG. 13.

The swing beam 4 is made of I section steel, and so structured as to turn swingingly in a horizontal plane by attaching its base end to a beam bracket 10 provided to the lower end of the base 2b of the base member 2 through a bolt 10a as shown also in FIG. 14. Furthermore, a stay 12 is disposed rotatably together with the swing beam 4 between a hinge 11 provided to the upper end of the base 2b and the front end of the swing beam 4 so that the swing beam 4 may not deflect by adjusting the length of the stay 12 by turning a turn buckle 12a disposed on the stay 12 adjacent to the front end of the swing beam 4.

Figure 17:
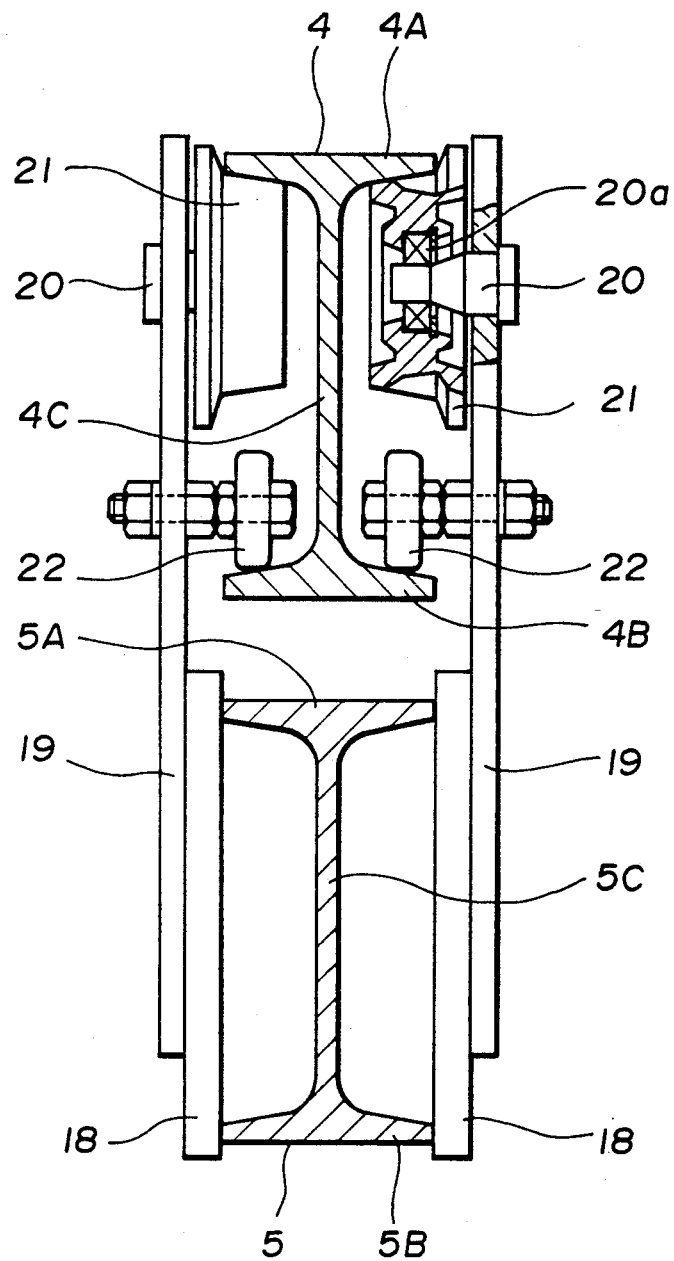
FIG. 17 is an enlarged sectional view along section lines XVII—XVII of FIG. 11.

The slide beam 5 has an overall length about equal to that of the swing beam 4 and is made of I section steel similarly to the swing beam 4 as shown in FIG. 14 and FIG 17. The slide beam 5 is provided with roller support plates 19 opposed with each other and extending upward to the swing beam 4 through base plates 18 fixed between upper and lower flanges 5A and 5B on both side of the base end thereof as shown in FIG. 17. And the roller support plates 19 are provided with rollers 21 supported by roller shafts 20 through bearings 20a on the respective internal faces thereof, similarly to the case of the aforementioned first embodiment.

In this embodiment, the swing beam 4 is provided with a motor driven trolly 75 (beam driving means) on the front end thereof, rollers of the motor driven trolly 75 are so structured as to roll in contact with the lower face the upper flange 5A on both sides of a web 5C of the slide beam 5, and the rollers 21 attached to the slide beam 5 are also so structured as to roll in contact with the lower face of the upper flange 4A on both sides of a web 4C of the swing beam 4. Whereby, the slide beam 5 is designed so as to extend from the front end of the swing beam 4 slidingly in the longitudinal direction of the swing beam 4 by actuating the trolly 75. Additionally, the roller support plates 19 are also disposed with small rollers 22 to be in contact with the upper face of the lower flange 4B of the swing beam 4 on the internal faces thereof so as not to produce rattle between the both beams 4 and 5, and the swing beam 4 is disposed with stopper 23 similarly to the case of the first embodiment at positions adjacent to the front end and the base end thereof in order to put a limitation of the slidable range of the slide beam 5.

The hanger 6 is provided with a roller holder frame 32 having a U-like shaped section to be fitted with the lower flange 5B of the slide beam 5 similarly to the case of the aforementioned first embodiment shown in FIG. 5. The frame 32 is provided with rollers 34 to be in contact with the upper face of the lower flange 5B on both sides of the web 5C of the slide beam 5 on the internal face of walls thereof, and so designed as to be movable along the lower flange 5B of the slide beam 5. In this case, the slide beam 5 is disposed with a stopper 31 at the front end of the web 5C thereof so that the frame 32 may not disengage from the slide beam 5.

The frame 32 is provided with a pair of pulley suspender plates 35 extending downwardly from the bottom face thereof, and the plates 35 are disposed with a pulley 37 supported by a pin 36 therebetween.

The pulley 37 is wound with a rope 40 connected to a motor driven hoist 76 suspending the wire feeder 54 of the welding machine, which is movable in the vertical direction by actuating the motor driven hoist 76.

Figure 13:
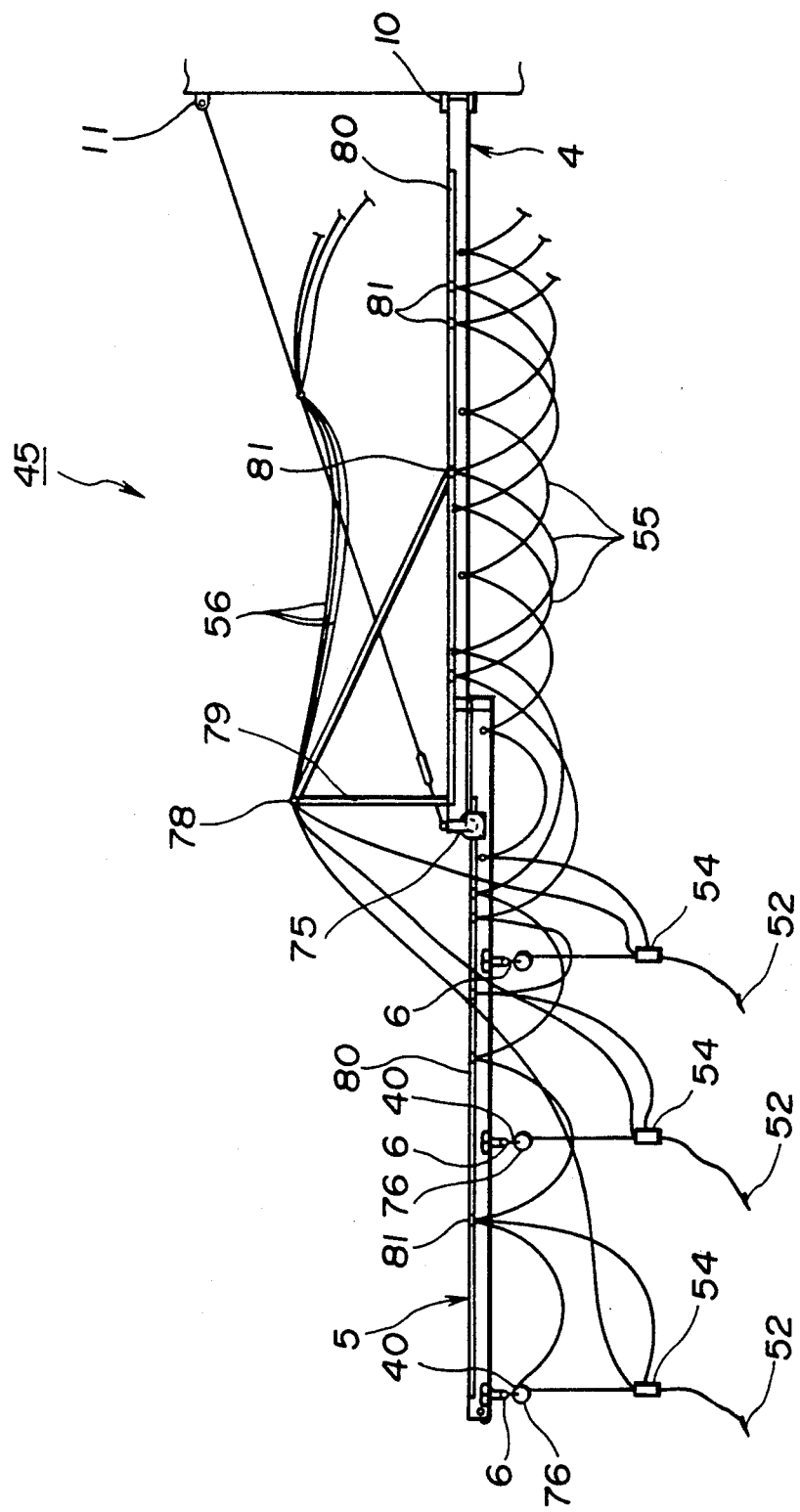
FIG. 13 is a side view illustrating beams suspending three wire feeders of the suspender arm shown in FIG. 11.

The suspender arm 45 is provided with a pail mount 77 to be placed with the container pail 61 of the welding wire at the lower part of the base member 2, which can be placed with three container pails 61 thereon in this embodiment. In this case, the slide beam 5 is disposed with three hangers 6 as shown in FIG. 13, thereby enabling the welding in three points at the same time. The swing beam 4 is provided with a guide bar 79 between two king post 78 on the upper side at the front end thereof so that the respective flexible conduits 56 may be not entangled under the both beams 4 and 5.

Figure 15:
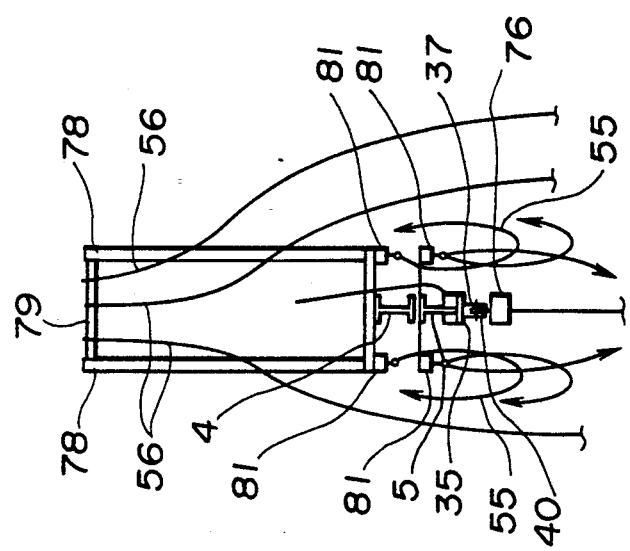
FIG. 15 is a front view of the beams of the suspender arm shown in FIG. 13.

In the suspender arm 45 according to this embodiment, two cable rails 80 made of C section steel are disposed on the both sides of the swing beam 4 and the slide beam 5 respectively so as to direct downward the opening of the C section steel as shown in FIG. 14 and FIG. 15, in order to suspend the welding cable 55 and the like from the cable rails 80 through rings provided to rollers 81 fitted into the cable rails 80 movably along the cable rails 80.

The suspender arm 45 is possible to be operated similarly to the suspender arm 1 according to the first embodiment by actuating the motor driven trolley 75 and the motor driven hoist 76 and has the effects similar to the aforementioned suspender arm 1 according to the first embodiment.

In the suspender arm 45, it is possible to move the whole body of the both beams 4 and 5 not only in the vertical direction, but also in the lateral direction, therefore, another effect can be obtained in addition to the effects of the suspender arm 1 of the first embodiment in that it is possible to be applied to massive welding construction.

The third embodiment of the suspender arm according to this invention will be described below on basis of FIG. 18. In this embodiment, a case is exemplified where an intake nozzle and a duct of dust-collecting equipment is suspended by suspender arm according to this invention.

Figure 18:
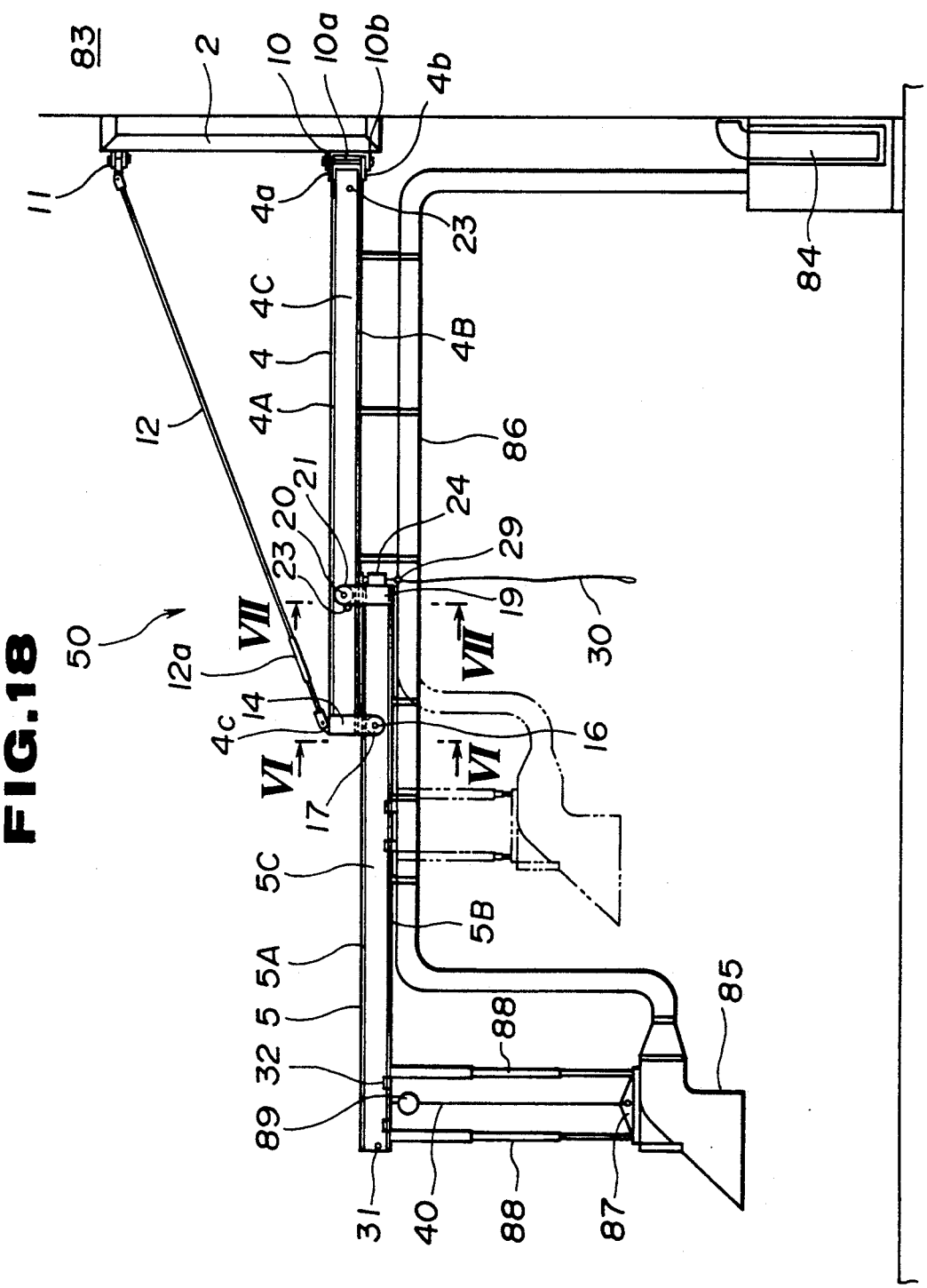
FIG. 18 is a side view illustrating the third embodiment of the suspender arm according to this invention.

A suspender arm 50 is provided to a base member 2 fixed on the wall 83 of the workshop house, and composed mainly of a swing beam 4 attached on the base member 2 rotatably in a horizontal plane, a slide beam 5 disposed under the swing beam 4 slidably in the longitudinal direction of the swing beam 4, and a hanger 6 (hanger means) disposed on the slide beam 5 movably along the slide beam 5 as shown in FIG. 18. The hanger 6 is structured so as to suspend an intake nozzle 85 of the dust-collecting equipment, and the intake nozzle 85 is connected with a dust extractor 84 through a retractable duct 86.

The swing beam 4 is made of I section steel and provided with an upper plate 4a and a lower plate 4b at the base end thereof. The upper and lower plated 4a and 4b of the swing beam 4 are fitted to a beam bracket 10 provided on the lower end of the base member 2, and the swing beam 4 is attached to the base member 2 rotatably in the horizontal plane by putting a bolt 10a in the vertical direction through holes formed in the plated 4a, 4b and the beam bracket 10 and holding the bolt 10a firmly with a nut 10b in this state.

In this case, a stay 12 is disposed similarly to the case of the suspender arm 1 according to the first embodiment so that the swing beam 4 may not deflect by adjusting the length of the stay 12 by turning a turn buckle 12a disposed on the stay 12 adjacent the projection 4c.

The swing beam 4 is provided with roller suspender plates 14 through base plates 13 fixed between upper and lower flanges 4A and 4B on both sides of the front end thereof similarly to the case of the first embodiment shown in FIG. 6, and is disposed with rollers 17 supported by the roller shafts 16 through bearings 15 on the internal faces of the roller suspender plates 14.

The slide beam 5 is made of I section steel as shown in FIGS. 6 and 7 similarly to the case of the first embodiment and has an overall length about equal to that of the swing beam 4. The slide beam 5 is provided with rollers 21 to be in contact with the upper flange 4A of the swing beam 4 through a roller support plates 19 and roller shafts 20 at the base end thereof, and is so designed as to extend from the front end of the swing beam 4 slidingly in the longitudinal direction of the swing beam 4 in the same manner as the case of the suspender arm 1 according to the first embodiment as shown in FIG. 6 and FIG. 7.

Also in this embodiment, the roller support plates 19 are provided with rollers 22 to be in contact with the lower flange 4B of the swing beam 4 and the swing beam 4 is disposed with stoppers 23 adjacent to the both ends respectively.

Furthermore, the slide beam 5 is disposed with a brake 24 having the same structure as shown in FIG. 8 at the base end thereof.

The hanger 6 is provided with roller holder frames 32 having U-like shaped sections to be fitted with the lower flange 5B of the slide beam 5 similarly to the case of the first embodiment shown in FIG. 5, and so structured as to suspend the intake nozzle 85 of the dust-collecting equipment movably in the vertical direction by connecting the frames 32 and a suspending bracket 87 attached to the intake nozzle 85 through a pair of telescopic rods 88.

The frames 32 are disposed with rollers 34 to be in contact with the upper face of the lower flange 5B on both sides of the web 5C of the slide beam 5, and so structured as to move along the lower flange 5B of the slide beam 5. And the slide beam 5 is disposed with a stopper 31 at the front end of the web 5C thereof so that the frames 32 may not disengage from the slide beam 5 as shown in FIG. 5.

The frames 32 are provided with a pair of pulley suspender plates 35 (not shown in FIG. 18) extending downwardly therebetween. The plates 35 are disposed with a pulley 37 supported by a pin 36 therebetween, and a rope 40 of which one end is connected to the suspending bracket 87 of the intake nozzle 85 and of which another end is connected to a balancer 89 is wound around the pulley 37 so as to enable the intake nozzle 85 to be moved with little efforts.

The dust extractor 84 of the dust-collecting equipment is installed adjacent to the wall 83 of the workshop house and housed with a dust container box. And the dust extractor 84 is connected with the intake nozzle 85 through the retractable duct 86, having telescopic structure or bellows-like structure, and the duct 86 is so designed as not to creep on the floor by supporting the retractable duct 86 with the swing beam 4 and the slide beam 5 even when the intake nozzle 85 is moved.

In a case where large-sized machine tools or works are placed on a way of the intake nozzle 85, it is possible to avoid them from being hit by pushing up the intake nozzle 85. Furthermore, it is possible to get out of the way of the crane or the like by turning the swing beam 4 swingingly in a horizontal plane toward the wall 83 of the workshop.

As mentioned above, the suspender arm according to this invention has a swing beam supported rotatably in a horizontal plane at its base end by a base member actuated perpendicularly or horizontally by driving means according to demand, and a slide beam disposed to the swing beam slidably in a longitudinal direction of the swing beam. Therefore, by suspending machinery such as welding equipment or dust-collection equipment using the suspender arm having the above-mentioned structure, excellent effects can be obtained in that it is possible to carry the wire feeder of the welding equipment inclusive the welding torch or the intake nozzle of the dust-collecting equipment very easily passing above machine tools and works placed in the workshop by turning the swing beam and extending the slide beam from the swing beam, the cables or the duct is never damaged by catching the angular parts of the machine tools and the works and never carries off the worker's feet by coiling round them since the cables or the duct is suspended from the beams, furthermore, it is possible to get the welding equipment or the dust-collecting equipment and the beams out of the way of a crane, a fork lift truck or the like by contracting the slide beam and turning the swing beam swingingly to the wall side of the workshop temporarily.

What is claimed is:

1. A suspender arm for suspending machinery comprising:
   a base member movably mounted on a support for movement in a vertical direction;
   a base driving means for moving said base member vertically on said support;
   a swing beam supported by said base member for rotation in a horizontal plane at a base end of said base member;
   a slide beam slidably connected to said swing beam for movement in a longitudinal direction of the swing arm.

2. A suspender arm as set forth in claim 1, wherein said base member is mounted on a frame member movable horizontally by a frame driving means.

3. A suspender arm as set forth in claim 2, wherein said slide beam is actuated by a beam driving means.

4. A suspender arm as set forth in claim 1, wherein said machinery is welding equipment,
   said slide beam is disposed with a hanger means movable therealong for suspending a wire feeder to feed a welding wire to a welding torch of the welding equipment, and
   said both beams are further disposed with cable hanger means movable therealong for suspending a cable connected between a welding source and the welding torch or the wire feeder of said welding equipment.

5. A suspender arm as set forth in claim 2, wherein said machinery is welding equipment,
   said slide beam is disposed with a hanger means movable therealong for suspending a wire feeder to feed a welding wire to a welding torch of the welding equipment, and
   said both beams are further disposed with cable hanger means movable therealong for suspending a cable connected between a welding source and the welding torch or the wire feeder of said welding equipment.

6. A suspender arm as set forth in claim 3, wherein said machinery is welding equipment,
   said slide beam is disposed with a hanger means movable therealong for suspending a wire feeder to feed a welding wire to a welding torch of the welding equipment, and
   said both beams are further disposed with cable hanger means movable therealong for suspending a cable connected between a welding source and the welding torch or the wire feeder of said welding equipment.

7. A suspender arm as set forth in claim 1, wherein said machinery is dust-collecting equipment,
   said slide beam is disposed with a hanger means movable therealong for suspending an intake nozzle of the dust-collecting equipment, and
   said both beams support a retractable duct connected between said intake nozzle and a dust extractor of said dust-collecting equipment.

8. A suspender arm as set forth in claim 2, wherein said machinery is dust-collecting equipment,
   said slide beam is disposed with a hanger means movable therealong for suspending an intake nozzle of the dust-collecting equipment, and
   said both beams support a retractable duct connected between said intake nozzle and a dust extractor of said dust-collecting equipment.

9. A suspender arm as set forth in claim 3, wherein said machinery is dust-collecting equipment,
   said slide beam is disposed with a hanger means movable therealong for suspending an intake nozzle of the dust-collecting equipment, and
   said both beams support a retractable duct connected between said intake nozzle and a dust extractor of said dust-collecting equipment.

* * * * *